PLATE MODULATED HYBRID TRANSMITTER WITH TUBE POTENTIALS DERIVED FROM TRANSISTOR STAGES
Filed Aug. 5, 1960 3 Sheets-Sheet 1
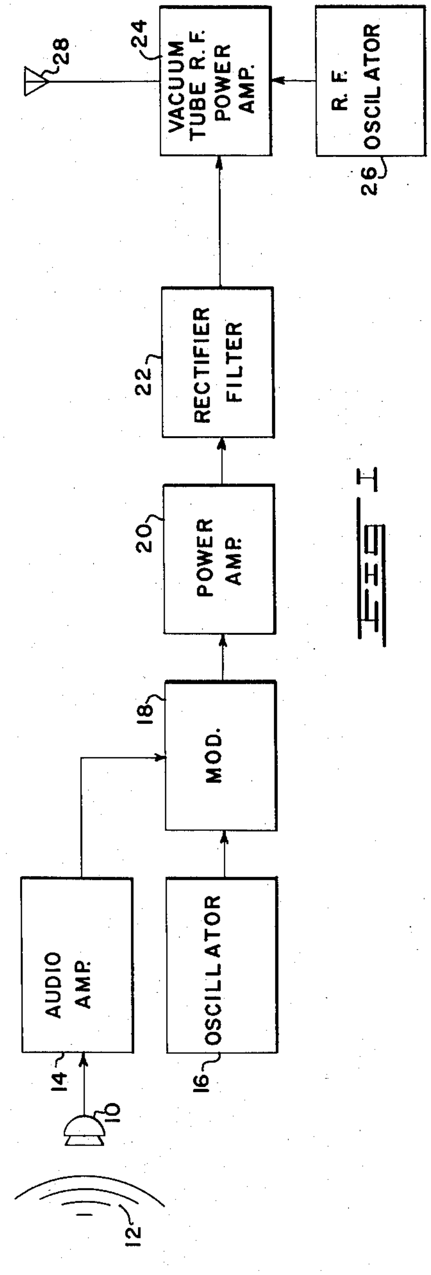
FIG. I
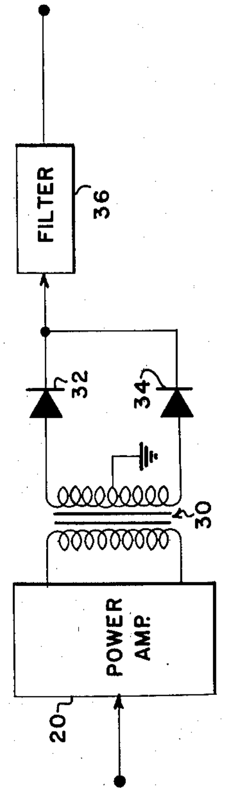
FIG. II
INVENTOR
ROBERT M. EISENBERG
BY James B. Boyer
ATTORNEY Aug. 27, 1963 R. M. EISENBERG 3,102,234
PLATE MODULATED HYBRID TRANSMITTER WITH TUBE POTENTIALS DERIVED FROM TRANSISTOR STAGES
Filed Aug. 5, 1960 3 Sheets-Sheet 2

INVENTOR
ROBERT M. EISENBERG

BY James B. Boyer

ATTORNEY

Aug. 27, 1963 R. M. EISENBERG 3,102,234

PLATE MODULATED HYBRID TRANSMITTER WITH TUBE POTENTIALS DERIVED FROM TRANSISTOR STAGES

Filed Aug. 5, 1960 3 Sheets-Sheet 3

INVENTOR

ROBERT M. EISENBERG

BY James B. Boyer

ATTORNEY

United States Patent Office 3,102,234
Patented Aug. 27, 1963

3,102,234
PLATE MODULATED HYBRID TRANSMITTER WITH TUBE POTENTIALS DERIVED FROM TRANSISTOR STAGES

Robert M. Eisenberg, Rockville, Md., assignor to ACF Industries, Incorporated, New York, N.Y., a corporation of New Jersey Filed Aug. 5, 1960, Ser. No. 47,643
1 Claim. (Cl. 325—104)

This invention relates to mobile transmitters and more particularly to a radio telephone transmitter which operates directly from the battery employed in a vehicle and without any separate high voltage supply source.

Mobile radio transmitters generally employ electron type tubes throughout. Electron tubes which are usable at high frequencies and high power levels usually require approximately 300 volts D.C. or more for the plate supply. Vibrators or dynamotors are used to increase the supply voltage available from the battery or the generator of a vehicle to a magnitude sufficient to supply these tubes. These devices for raising the voltage not only increase the weight and complexity of a mobile communications system, but also reduce the efficiency of the overall system.

Mobile radio transmitters which employ transistors have been devised. However, power transistors capable of producing the desired output power and of operating at the higher frequencies commonly employed in vehicle communication systems are not readily available. Therefore, transistorized mobile transmitters are somewhat limited in their application, and conventional transmitters employing electron tubes solely, or a combination of transistors and electron tubes, require a separate high voltage power supply for the tubes. Furthermore, full modulation (100%) of a radio frequency carrier requires that the potential applied to the various elements of a RF amplifier tube be varied between zero and twice the steady state value. Some systems employ rectified speech signals for modulation of the RF amplifier tube. In these systems severe distortion of the signals results.

According to a feature of this invention a more efficient mobile radio transmitter is provided which requires no separate high voltage power supply. Transistors are employed throughout the transmitter with the exception of the radio frequency power stage or stages. An electron tube is employed in the final RF stage and this tube is plate modulated. The system of modulation is arranged to provide the modulating potential and the required D.C. supply potential to this tube without the necessity of a separate high voltage source.

An additional feature of this invention is in the provision of a mobile transistorized transmitter employing one or more vacuum tubes only in the RF section of the transmitter. The transmitter is supplied directly from the battery (or the generator) of a vehicle without the use of a vibrator or dynamotor type power supply. Audio frequency compensation components are not required in the power amplifier stages, which employ transistors, since compensation for a wide range of audio frequencies is not required.

A further feature of the present invention is in the provision of a simplified system for obtaining modulating and supply voltages for use in vehicular electrical communication systems.

In an illustrative embodiment of the invention, an audio modulated signal is amplified, and then detected and filtered. The output of the rectifier-filter is applied as the supply and as the operating potentials to a vacuum tube RF amplifier to modulate a carrier also applied to this amplifier. Hence, no separate high voltage source is necessary for the RF amplifier since the system of modulation of this amplifier provides the necessary modulating and supply voltages. By this arrangement the overall efficiency of the system is increased greatly, the physical size of the transmitter and the amount of equipment required is reduced and distortion is maintained at a minimum.

These and other features of this invention may be more fully appreciated when considered in the light of the following specification and drawings in which:

FIG. 1 is a block diagram of the transmitter of the present invention;

FIG. 2 illustrates in simplified form one arrangement for the rectifier and filter of FIG. 1;

Figure 3A:
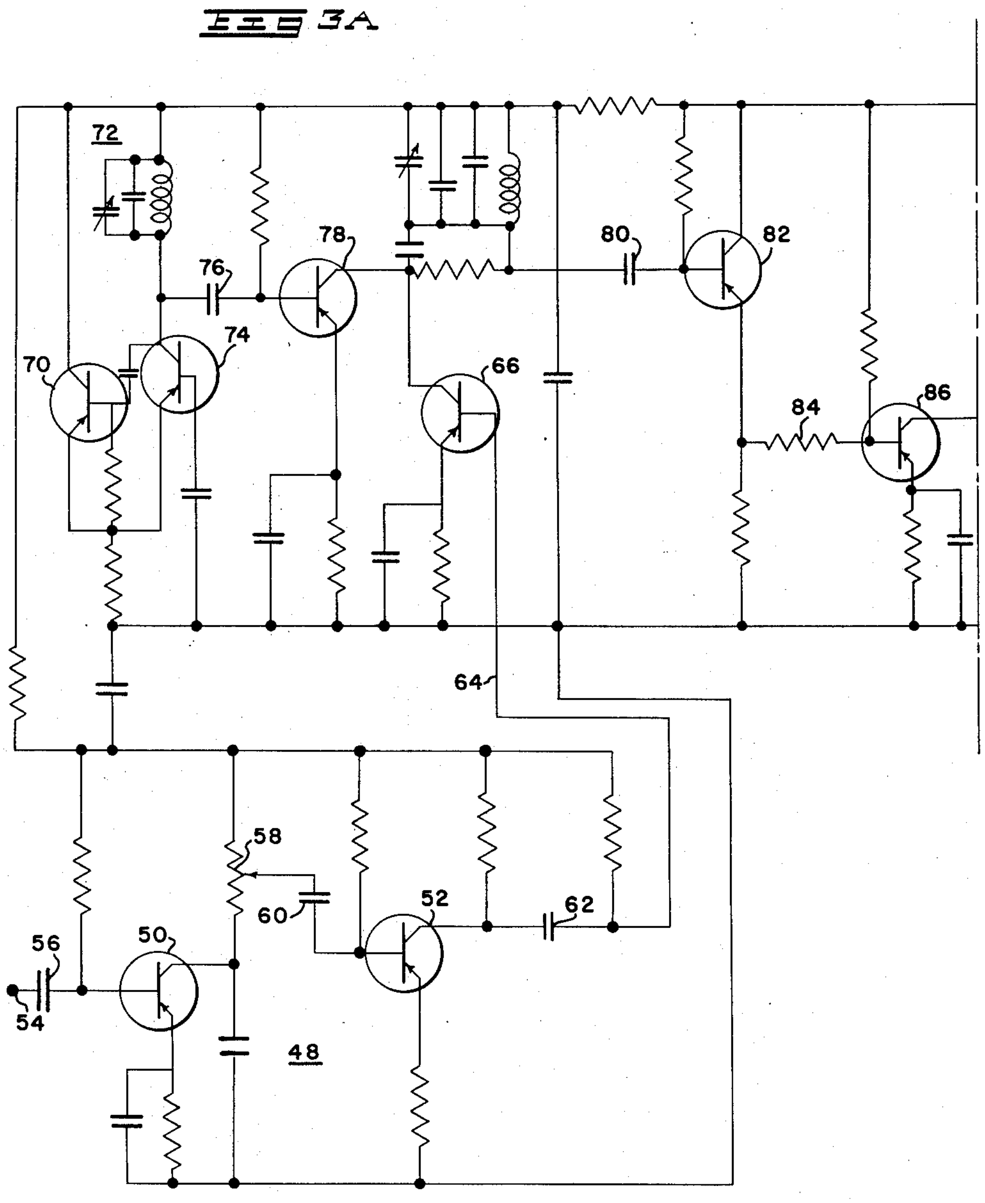
FIGS. 3A and 3B illustrate a circuit diagram for the transmitter of the present invention.

FIG. 1 illustrates in block diagram form the transmitter of the present invention. An audio transducer 10, such as a microphone, is connected to an audio amplifier 14. The audio amplifier 14 and an oscillator 16 are connected to a modulator 18. The oscillator 16 produces a subcarrier which is modulated by the modulating or audio wave from the audio amplifier 14 in the modulator 18. The output of the modulator 18 is connected through a power amplifier 20 to a rectifier and filter circuit 22. The output of the rectifier and filter circuit 22 is applied as the supply and the operating potentials to a vacuum tube RF power amplifier 24. An RF oscillator 26 is also connected to the RF power amplifier 24 and the output from the rectifier and filter circuit 22 modulates the carrier produced by the RF oscillator 26. The output of the RF power amplifier 24 is connected to a transmitting antenna 28.

The audio transducer 10 transforms impinging sound waves 12 into electrical signals which are amplified by the audio amplifier 14. The oscillator 16 produces a subcarrier which, for example, may be fifty kilocycles. The amplified electrical signals from the audio amplifier 14 are employed by the modulator 18 to vary the magnitude (modulate) of the subcarrier. The output from the modulator 18 is amplified by the power amplifier 20. Each of these stages (the amplifier 14, the oscillator 16, the modulator 18 and the amplifier 20) comprise transistor circuits. Since transistor circuits are employed in these stages, only a low voltage power supply is required, such as 12 volts D.C. which may be supplied from the battery of a vehicle.

According to a feature of the present invention, the modulated subcarrier is amplified by the power amplifier 20 and applied to the rectifier and filter circuit 22. The filter, for example, may be a 50 kc. filter network which is arranged to suppress the 50 kc. sub-carrier. The rectifier and filter circuit 22 detects and filters the modulated sub-carrier. The output from the filter is applied as the plate supply of a vacuum tube in the RF power amplifier 24, and it is also employed to modulate the carrier from the RF oscillator 26 to produce a radio frequency signal which is transmitted by the antenna 28.

As noted above as an example and not as a limitation, the sub-carrier may be a 50 kc. signal and the filter may be a 50 kc. filter network. As a further example of the type of operation that may be employed, the power amplifier 20 may be arranged in a conventional manner to deliver 300 volts at 50 kc. to the rectifier and filter circuit 22 when the sub-carrier is unmodulated. This sub-carrier is rectified and filtered by the rectifier and filter circuit 22 to obtain +300 volts D.C. Audio modulation of the 50 kc. sub-carrier by the modulator 18 produces a varying D.C. output from the rectifier and filter circuit 22 and this output follows the audio voltage up to a swing of 0 to 600 volts which occurs at 100% modulation.

When this voltage from the rectifier and filter circuit 22 is applied as the plate supply to the vacuum tube in the radio frequency amplifier 24 (for example, a class C amplifier), a 100% modulated radio frequency output results at the desired operating frequency (carrier frequency).

FIG. 2 illustrates one arrangement for the rectifier of the present invention. The power amplifier 20 is connected through a transformer 30 to a pair of rectifiers 32 and 34 which are shown as diodes. The rectifiers 32 and 34 are connected to the input of a filter network 36. The output of the filter network 36 is applied to the vacuum tube RF power amplifier 24 (FIG. 1).

The rectifier and filter circuit illustrated in FIG. 2 operates in the same manner as described previously. That is, the modulated sub-carrier which is amplified by the power amplifier 20 is subsequently detected and filtered by the rectifiers 32 and 34 and the filter 36, respectively. The output of the filter 36 is applied as the supply and modulating voltages to the RF power amplifier 24.

Figure 4:
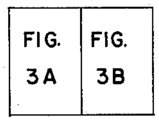
FIG. 4 is a diagram of the relationship of FIGS. 3A and 3B.
Figure 3B:
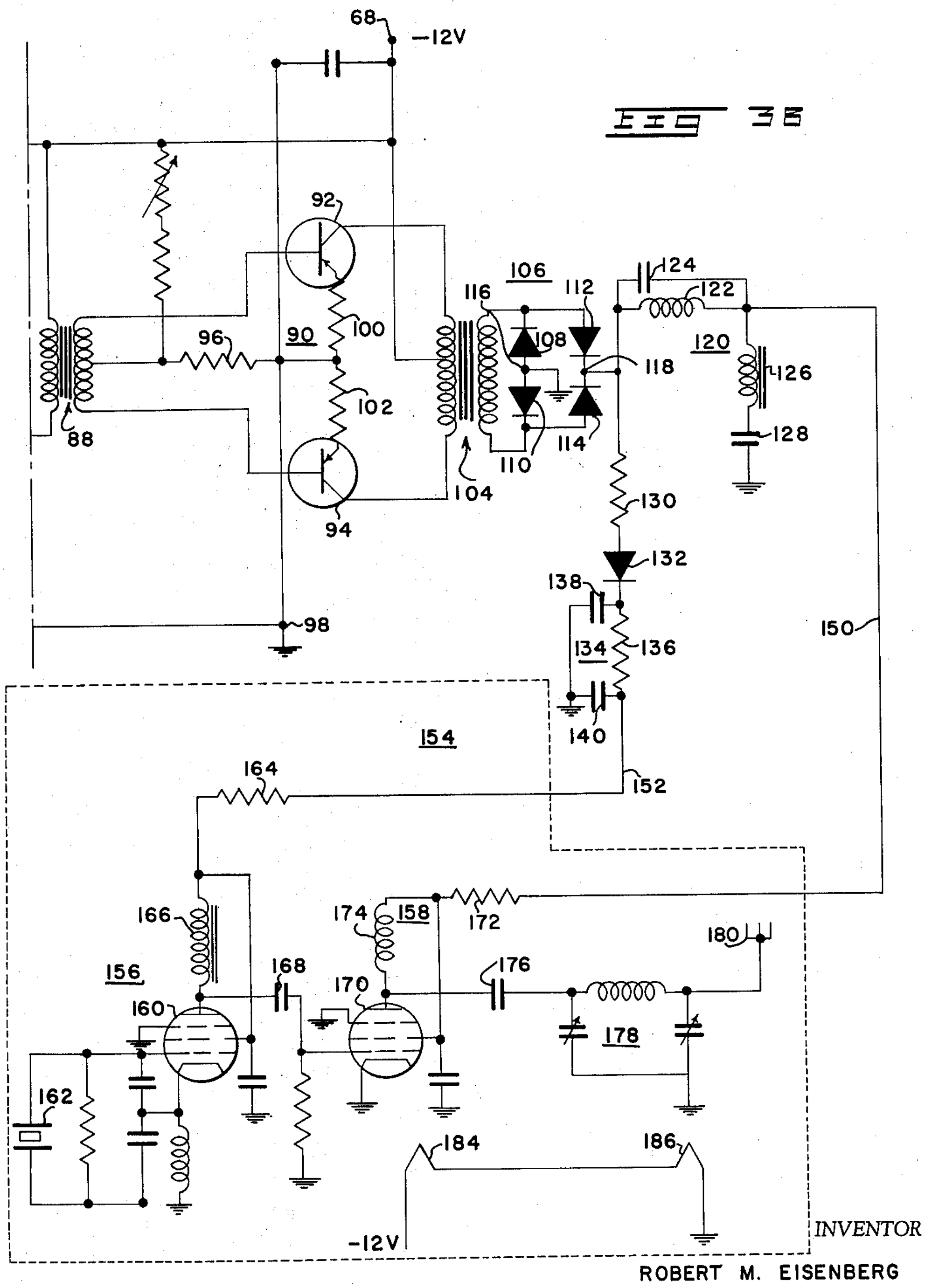

FIGS. 3A and 3B, when taken together as illustrated in FIG. 4, comprise a detailed circuit diagram of a transmitter utilizing the principles of the present invention. The transmitter includes an audio amplifier 48 comprising transistors 50 and 52. An audio transducer (not shown) may be connected to a terminal 54. The terminal 54 is connected through a coupling capacitor 56 to the base of the transistor 50. The collector of the transistor 50 is connected to a potentiometer 58. This potentiometer 58 may serve to control the gain of the audio amplifier 48. The movable tap of the potentiometer 58 is connected through a coupling capacitor 60 to the base of the transistor 52. The collector of the transistor 52 is connected through a capacitor 62 to a lead 64 which extends to the base of a transistor 66 which serves as a modulator. The potentials for transistors 50, 52 and 66, and the other transistors in the transmitter are supplied from a negative D.C. source, such as a 12 volt battery within a vehicle, connected to a terminal 68. A positive terminal of the battery may be connected to a ground terminal 98.

A transistor 70 is connected to operate as an oscillator to generate a sub-carrier. The frequency of oscillation is determined by the values of the components in the L-C network 72. The transistor 70 is connected to a transistor 74 which serves as a buffer. The collector of the transistor 74 is connected through a capacitor 76 to the base of a transistor 78. The transistor 78 amplifies the sub-carrier produced by the oscillator and applies the amplified sub-carrier to a modulator comprising the transistor 66. The collector of the transistor 78 is connected to the collector of the transistor 66. The second transistor 52 of the audio amplifier 48 is connected to the base of the transistor 66 by the lead 64. With this arrangement the output of the audio amplifier 48 modulates the amplified sub-carrier from the transistor 78.

The modulated sub-carrier is applied through a capacitor 80 to the base of a transistor amplifier 82. The emitter of the transistor 82 is connected through a resistance 84 to the base of a driver transistor 86. The collector of the driver transistor 86 is connected to the primary of a coupling transformer 88 which is illustrated in FIG. 3B.

The secondary of the transformer 88 is connected to a power amplifier 90 (FIG. 3B). The power amplifier 90 includes transistors 92 and 94 which are connected in a push-pull configuration. The secondary of the transformer 88 is connected to the bases of the transistors 92 and 94. A center tap on the secondary of the transformer 88 is connected through a resistance 96 to the ground terminal 98 which may be connected to the positive terminal of the battery within a vehicle as noted above. The emitters of the transistors 92 and 94 are connected through resistances 100 and 102, respectively, to the ground terminal 98. The collectors of the transistors 92 and 94 are connected to the primary of a transformer 104.

A center tap on the primary of the transformer 104 is connected to the negative potential terminal 68.

The secondary of the transformer 104 is connected to a full-wave bridge rectifier generally designated by a reference numeral 106. The bridge rectifier 106 includes four diodes 108, 110, 112 and 114. One output terminal 116 of the bridge rectifier 106 is connected to ground. A remaining output terminal 118 of the bridge rectifier 106 is connected to a filter network 120. The filter network includes a series inductance 122 and a capacitor 124 connected in parallel therewith. The filter network 120 also includes an inductance 126 connected in series with a capacitor 128 to ground. The output terminal 118 of the bridge rectifier 106 is also connected in series with a resistance 130 and a rectifier 132 to a filter network 134. The filter network 134 includes a resistance 136 and a pair of capacitors 138 and 140. One terminal of each of the capacitors 138 and 140 is connected to an opposite side of the resistance 136 and the remaining terminals of these capacitors are connected to ground. The output terminals of the filter networks 120 and 134 are connected by respective leads 150 and 152 to an RF unit 154.

The RF unit 154 may be a conventional modular packaged unit of the desired frequency output. As illustrated in FIG. 3B, the RF unit 154 employs electron tubes. An oscillator 156 includes a tube 160 and associated circuitry. This oscillator 156 provides a carrier for the transmitter. The oscillator 156 also includes a crystal 162 which controls the frequency of the carrier in a conventional manner. The plate power supply and the modulating voltage for the tube 160 are supplied along the lead 152 through a resistance 164 and an inductance 166. The plate of the tube 160 is connected through a capacitor 168 to the control grid of a tube 170 in an RF amplifier 158. The plate supply and the modulating voltage for the tube 170 are supplied from the lead 150 through a resistance 172 and an inductance 174. The plate of the tube 170 is connected through a capacitor 176 to a tuned circuit 178. The output of the tuned circuit 178 is connected to an antenna 180. The tubes 160 and 170 include filaments 184 and 186, respectively, which are shown separate from the tubes for simplicity of illustration. The filaments 184 and 186 are connected in series with the 12-volt supply source.

The transmitter illustrated in FIGS. 3A and 3B operates in the same manner as described in connection with FIGS. 1 and 2. An audio transducer such as a microphone (not shown) is connected to the input terminal 54, and the electrical signals from the transducer are amplified by the audio amplifier 48. The gain of the audio amplifier 48 may be controlled as desired by the potentiometer 58. The output of the audio amplifier 48 is applied through the lead 64 to the base of the modulator transistor 66. The sub-carrier generated by the oscillator transistor 70 is applied to the collector of the modulator transistor 66 through the transistors 74 and 78 and the variations in the audio signal modulate this sub-carrier. The modulated sub-carrier is amplified by the transistor 82 and applied to the base of the driver transistor 86. The output of the driver transistor 86 is applied to the power amplifier 90 through the transformer 88.

According to a feature of the present invention, the output of the power amplifier 90 is applied through a transformer 104 to a rectifier bridge 106. The rectifier bridge 106 detects or rectifies the modulated sub-carrier. The resulting rectified signal is filtered by the filter network 120 and applied as the modulating voltage and as the supply voltage to the plate of the RF amplifier tube 170. As an example of a typical operation of such an arrangement, the power amplifier 90 may be arranged to deliver 300 volts at 50 kc. sub-carrier (provided initially from the sub-carrier oscillator transistor 70) to the rectifier 106 when the sub-carrier is unmodulated by audio signals from the audio amplifier 48. This sub-carrier is then rectified by the bridge rectifier 106 and filtered by the filter network 120 (which may be a filter network designed to block a 50 kc. signal) to obtain +300 volts D.C. Audio modulation of the 50 kc. sub-carrier produces a varying D.C. output from the rectifier 106 and the filter 120 combination which follows the audio voltage up to a swing of 0 to 600 volts which occurs at 100% modulation. Application of this voltage as the plate supply and as the modulating voltage to the tube 170 in the RF amplifier 158 (which may be arranged for class C operation) results in 100% modulated RF output at the desired operating frequency (the carrier frequency provided by the RF oscillator 156).

According to a further feature of this invention, the transistor amplifiers are of simple construction. Note power amplifier 90, for example. No compensation for a wide range of audio frequencies is required in this amplifier; hence, large and expensive audio frequency components are not necessary. Additionally, by employing an audio modulated sub-carrier, the distortion of the transmitted signals is minimized.

As illustrated in FIG. 3B the plate supply for the tube 160 in the RF oscillator 156 is supplied from the bridge rectifier 106 through the resistance 130, the rectifier 132 and the filter network 134. These components prevent the audio signals passed by the rectifier bridge 106 from modulating the plate of the oscillator tube 160. This arrangement, along with the arrangement for supplying the plate voltage to the RF amplifier tube 170 eliminates the need for a separate high voltage supply ordinarily required for the operation of electron tubes.

Although the RF oscillator 156 is illustrated as employing an electron tube 160, it is to be understood that a conventional transistor oscillator may be employed to provide the carrier. The biassing potentials for the transistor may be supplied from the 12 volt D.C. source. In this event the resistance 130, the rectifier 132 and the filter network 134 (which provide the plate supply voltage for the oscillator tube 160) are not required.

Although the present invention has been illustrated and described by specific exemplary embodiments, it is to be understood that various changes may be made in the system. For example, different amplifier, modulator, oscillator, etc., circuits can be employed, as well as various sub-carrier and carrier frequencies and operating potentials. The mobile applications of the present transmitter are not limited to automotive vehicle use, but may be extended to aircraft, boats, etc. If desired, the transmitter of the present invention may be utilized in a fixed installation rather than in vehicles.

It is now apparent that the present invention provides a transmitter employing transistors and at least one electron tube which may be supplied directly from only a single low voltage supply source. Input audio signals are amplified and employed to modulate a sub-carrier. The modulated sub-carrier is subsequently amplified, rectified and filtered. The filtered output is then used as the modulating and supply voltages for a vacuum tube RF power amplifier. The output from the rectifier also may provide the plate supply for an RF oscillator which generates the carrier for the transmitter. The modulating voltage applied to the RF amplifier tube causes the carrier to be modulated, and the modulated carrier is subsequently transmitted by an antenna. Such an arrangement results in an increase in the overall efficiency of the system, a reduction in the physical size of the unit and a reduction in the amount of equipment required. Furthermore, distortion in the transmitted signal is a minimum.

What is claimed is:

A transmitter comprising a modulator, a first oscillator connected to the modulator for producing a sub-carrier, a first amplifier connected to the modulator and arranged to modulate the sub-carrier with an audio signal, a second amplifier connected to the output of the modulator, means to demodulate the output of the second amplifier, said modulator, first oscillator, first amplifier and second amplifier comprising electron discharge devices, all said electron discharge devices being transistors, a low voltage source connected to supply the transistors of the modulator, the first oscillator, the first amplifier and the second amplifier, a third amplifier including an electron tube having an anode which is connected to the output of said demodulator means, and a second oscillator for producing a carrier connected to the third amplifier, said second oscillator including an electron tube having a plate, and a rectifier and a filter connected from said demodulator means to supply the plate voltage of the tube in the second oscillator, whereby said demodulator means provides the modulating and supply voltages for the electron tubes and said low voltage source constitutes the sole source of electrical supply.

References Cited in the file of this patent

UNITED STATES PATENTS

| | | |
|---|---|---|
| 2,136,479 | Trevor | Nov. 15, 1938 |
| 2,214,573 | Booth | Sept. 10, 1940 |
| 2,900,459 | Olive | Aug. 18, 1959 |